(12) United States Patent
Kim et al.

(10) Patent No.: US 9,167,582 B2
(45) Date of Patent: Oct. 20, 2015

(54) SCHEDULING METHOD AND DEVICE HAVING CONTINUITY IN A WIRELESS PERSONAL AREA COMMUNICATION NETWORK

(75) Inventors: Suhwook Kim, Anyang-si (KR); Bonghoe Kim, Anyang-si (KR); Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 14/129,226

(22) PCT Filed: Nov. 22, 2011

(86) PCT No.: PCT/KR2011/008933
§ 371 (c)(1),
(2), (4) Date: Dec. 24, 2013

(87) PCT Pub. No.: WO2013/012136
PCT Pub. Date: Jan. 24, 2013

(65) Prior Publication Data
US 2014/0126558 A1 May 8, 2014

Related U.S. Application Data

(60) Provisional application No. 61/509,544, filed on Jul. 19, 2011.

(51) Int. Cl.
*H04W 72/04* (2009.01)
*H04W 84/12* (2009.01)
(Continued)

(52) U.S. Cl.
CPC .......... *H04W 72/0446* (2013.01); *H04W 74/04* (2013.01); *H04W 84/12* (2013.01); *H04W 84/18* (2013.01)

(58) Field of Classification Search
CPC . H04W 56/00; H04W 72/0446; H04W 74/02; H04W 84/18
See application file for complete search history.

(56) References Cited

U.S. PATENT DOCUMENTS

2008/0232345 A1* 9/2008 Espina et al. ................. 370/350
2009/0103501 A1* 4/2009 Farrag et al. ................. 370/337
(Continued)

FOREIGN PATENT DOCUMENTS

KR 10-0742776 7/2007
KR 2010-0007764 1/2010
KR 2011-0039859 4/2011

OTHER PUBLICATIONS

PCT International Application No. PCT/KR2011/008933, Written Opinion of the International Searching Authority dated Jul. 31, 2012, 5 pages.

(Continued)

*Primary Examiner* — Yong Zhou
(74) *Attorney, Agent, or Firm* — Lee, Hong, Degerman, Kang & Waimey

(57) ABSTRACT

The present description discloses a method for a first device to transmit data in a WPAN (wireless personal area network), comprising the steps of: transmitting, to a second device, a message requesting a transmission bandwidth for transceiving non-competitive data of a first device; receiving, from the second device, transmission bandwidth allocation information corresponding to the message requesting the transmission bandwidth; and transceiving data to/from the second device according to the transmission bandwidth allocation information, wherein the transmission bandwidth allocation information may include length, gap, and window information on the transmission bandwidth for non-competitive transception.

15 Claims, 9 Drawing Sheets

(51) Int. Cl.
*H04W 74/04* (2009.01)
*H04W 84/18* (2009.01)

(56) References Cited

U.S. PATENT DOCUMENTS

2009/0129353 A1* 5/2009 Ki et al. .................. 370/338
2010/0034159 A1* 2/2010 Shin et al. .................. 370/329
2012/0250664 A1* 10/2012 Li .................. 370/338

OTHER PUBLICATIONS

PCT International Application No. PCT/KR2011/008933, Written Opinion of the International Searching Authority dated Jul. 31, 2012, 13 pages.

* cited by examiner (a)          (b)

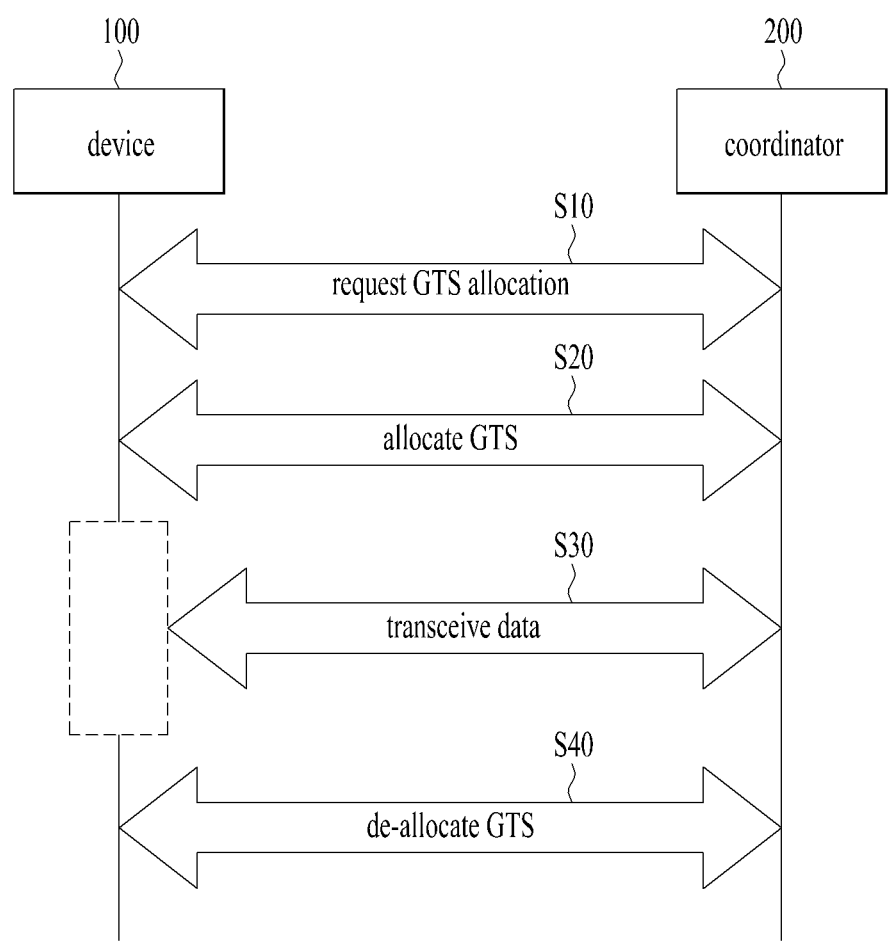

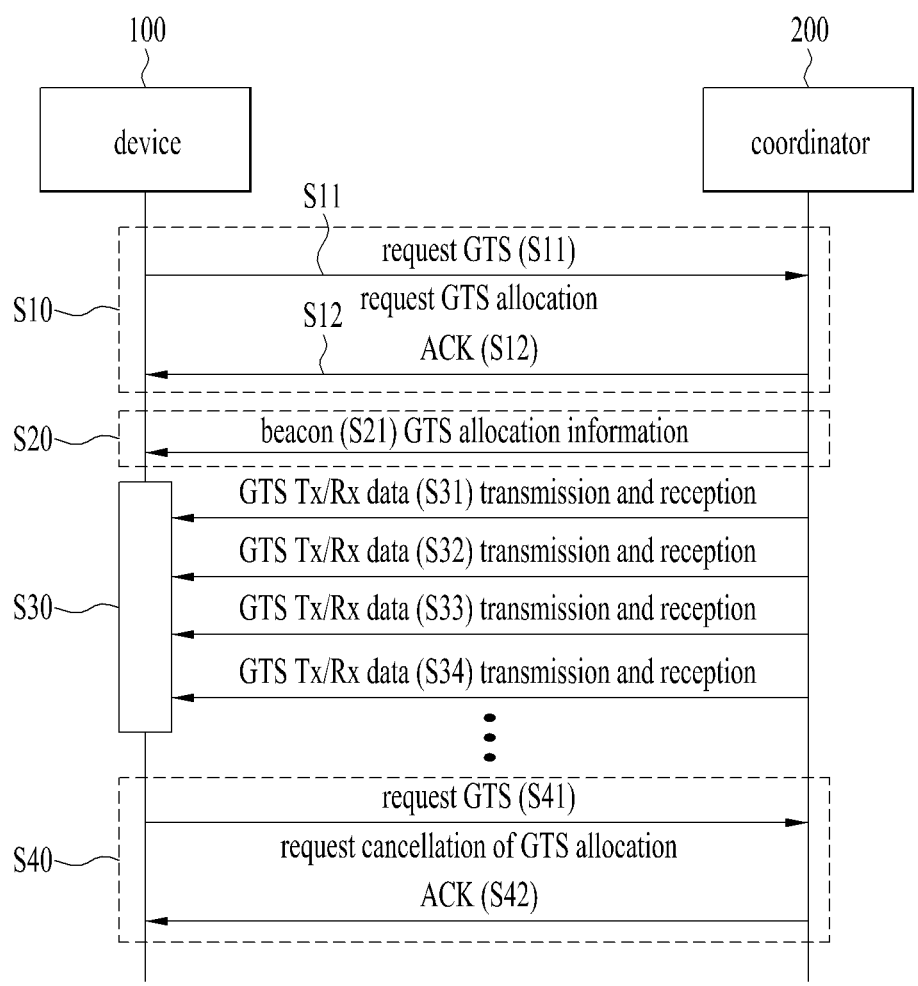

SCHEDULING METHOD AND DEVICE HAVING CONTINUITY IN A WIRELESS PERSONAL AREA COMMUNICATION NETWORK

CROSS-REFERENCE TO RELATED APPLICATIONS

This application is the National Stage filing under 35 U.S.C. 371 of International Application No. PCT/KR2011/008933, filed on Nov. 22, 2011, which claims the benefit of U.S. Provisional Application Ser. No. 61/509,544, filed on Jul. 19, 2011, the contents of which are all hereby incorporated by reference herein in their entirety.

TECHNICAL FIELD

The present invention relates to a method of scheduling in a wireless personal area network (hereinafter abbreviated WPAN) and apparatus therefor, and more particularly, to a persistent scheduling method using a GTS (guaranteed time slot) and an apparatus therefor.

BACKGROUND ART

Personal mobile devices can perform communication in a manner of establishing a low-rate wireless personal area network (hereinafter abbreviated LR-WPAN).

As an example of the LR-WPAN, there exists a network following IEEE 802.15.4 standard. The IEEE 802.15.4 standard provides transmission speed of 20 Kbps and 40 Kbps in 868/915 MHz band using BPSK (binary phase-shift keying) and provides transmission speed of 250 Kbps in 2.45 GHz band using O-QPSK (offset quadrature phase-shift keying). IEEE 802.15.4b standard provides transmission speed of 250 Kbps 868/915 MHz band using O-QPSK.

DISCLOSURE OF THE INVENTION

Technical Tasks

According to a GTS allocation scheme of a legacy IEEE 802.15.4 system, when a GTS is allocated to a device, the GTS is continuously allocated to every superframe until the GTS is de-allocated by a request of the device or expiration of the GTS.

A technical task intended to achieve by the present specification is to provide a method of allocating a GTS to not every superframe but periodical superframe among the superframe used in a WPAN system.

Another technical task intended to achieve by the present specification is to provide a method of allocating a GTS to a superframe with a period different from each other according to a device in a WPAN system.

The other technical task intended to achieve by the present specification is to provide a method of periodically designating a superframe for a device and allocating a GTS to a superframe belonging to a prescribed range of before and after the designated superframe in a WPAN system.

Technical Solution

To achieve these and other advantages and in accordance with the purpose of the present invention, as embodied and broadly described, according to one embodiment, a method of transmitting a data, which is transmitted by a first device in a WPAN (wireless personal area network) system, include the steps of transmitting a message, which makes a request for a transmission band used for a non-competitive data transmission and reception of the first device, to a second device, receiving a transmission band allocation information from the second device in response to the message, which makes a request for the transmission band, and transceiving a data with the second device in accordance with the transmission band allocation information, wherein the transmission band allocation information includes a length, an interval, and a window information of a transmission band used for a non-competitive transmission and reception.

The aforementioned one embodiment or other embodiments may include a prescribed one among the characteristics described in the following description.

The step of transceiving the data may include the step of transceiving a data using a superframe of the interval period among periodically formed superframes. And, the step of transceiving the data may include the step of transceiving a data using a superframe belonging to a band window based on the window information. The band window may include superframes preceding or following a superframe corresponding to the interval period. The transmission band used for the non-competitive data transmission and reception may correspond to a GTS (guaranteed time slot). The transmission band allocation information may be received in a manner of being included in a beacon frame. And, the transmission band allocation information may be received via a GTS descriptor within the beacon frame.

Moreover, the method further includes the step of determining a characteristic of the requested transmission band based on a characteristic of data used for the non-competitive data transmission and reception, wherein the characteristic of the transmission band may include a length of the transmission band, an allocation interval, or a size of a window.

To further achieve these and other advantages and in accordance with the purpose of the present invention, according to a different embodiment, a method of allocating a transmission band in a WPAN (wireless personal area network) system in which a first device and a second device participate includes the steps of receiving a message, which makes a request for a transmission band used for a non-competitive data transmission and reception, from the first device, allocating a non-competitive transmission band for the first device, and transmitting a transmission band allocation information for the first device, wherein the transmission band allocation information includes a length, an interval, and a window information of a transmission band used for a non-competitive transmission and reception.

The aforementioned different embodiment or other embodiments may include a prescribed one among the characteristics described in the following description.

The transmission band used for the non-competitive data transmission and reception may correspond to a GTS (guaranteed time slot). The transmission band allocation information may be transmitted via a beacon frame. The transmission band allocation information may be transmitted in a manner of being included in a GTS descriptor within the beacon frame.

Moreover, the method further includes the step of checking the non-competitive transmission band capable of being allocated for the first device and the transmission band allocation information is determined based on a result of the checking step. The message, which makes a request for the transmission band, includes a length of a requested band and a process of checking the non-competitive transmission band capable of being allocated is performed based on the length of the requested band.

To further achieve these and other advantages and in accordance with the purpose of the present invention, according to a further different embodiment, a user equipment of a WPAN (wireless personal area network) system includes a transmission and reception unit configured to perform a communication with a coordinator and a control unit configured to control the transmission and reception unit, the control unit configured to transmit a message, which makes a request for a transmission band used for a non-competitive data transmission and reception, to the coordinator, the control unit configured to receive transmission band allocation information from the coordinator in response to the message, which makes a request for the transmission band, the control unit configured to transceive a data with the coordinator, wherein the transmission band allocation information includes a length, an interval, and a window information of a transmission band used for a non-competitive transmission and reception.

Advantageous Effects

According to a method of allocating a GTS disclosed in the present specification, a device participating in a WPAN can make a request for GTS allocation to a coordinator of the WPAN by determining an attribute of a GTS according to a data type to be transceived.

According to a method of allocating a GTS disclosed in the present specification, a GTS is not exclusively allocated to a single device among the devices participating in a WPAN. Instead, a GTS is allocated to a plurality of devices in a manner of being divided.

According to a method of allocating a GTS disclosed in the present specification, a GTS necessary for transmitting data is allocated to a device according to a period without competition between devices. And, according to a method of allocating a GTS disclosed in the present specification, when a GTS is periodically allocated to a device, a section capable of transmitting data without competition with different devices can be secured before and after the period on which the GTS is allocated.

DESCRIPTION OF DRAWINGS

FIG. 4 is a rough flowchart for GTS management procedures capable of being selected by embodiments of the present specification in an LR-WPAN system;

FIG. 5 is a flowchart for GTS management procedures capable of being selected by embodiments of the present specification based on IEEE 802.15.4 standard corresponding to an example of an LR-WPAN;

BEST MODE

Mode for Invention

Figure 1:
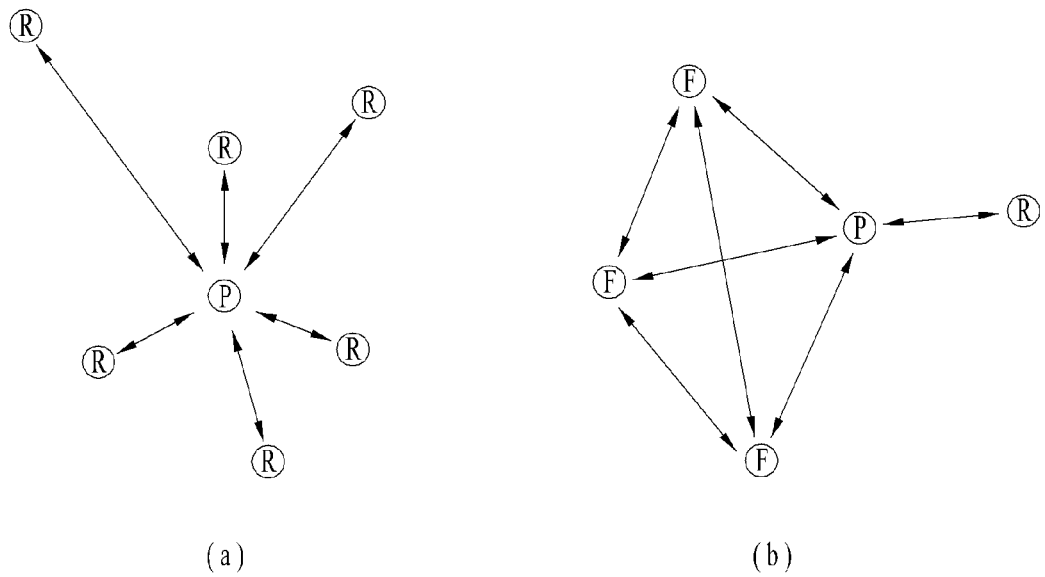
FIG. 1 is a diagram for an example of a network topology according to IEEE 802.15.4 standard.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, Suffixes 'module' and 'unit' for a component used in the present specification are given or used interchangeably in consideration of facilitation in preparing the specification only but do not have meanings or roles different from each other.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted.

And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The embodiments disclosed in the present specification can be supported by standard documents for a system according to IEEE 802.15.4 corresponding to a low-rate wireless personal area network (LR-WPAN) or standard documents disclosed for at least one of IEEE 802 system for a wireless access, 3GPP system, 3GPP LTE/LTE-A (LTE-advanced), and 3GPP2 system. In particular, the steps or parts, which are not explained to clearly reveal the technical idea of the present invention, in the embodiments of the present invention can be supported by the above documents. And, all terminologies disclosed in the present specification can be explained by the aforementioned standard documents.

In the following description, for clarity, embodiments of the present specification are explained centering on the IEEE 802.15.4 standard, by which the technical idea of the invention disclosed by the present specification may be non-limited.

FIG. 1 is a diagram for an example of a network topology according to IEEE 802.15.4 standard.

Devices of two types, i.e., a full function device (hereinafter abbreviated FFD) and a reduced function device (hereinafter abbreviated RFD) can participate in a network according to IEEE 802.15.4 standard. Hence, a topology of the network according to IEEE 802.15.4 standard can be determined in accordance with the function of the device participating in the network. FIG. 1 (a) is an example of a star topology and FIG. 1 (b) is an example of a peer-to-peer topology.

Since the FFD corresponds to a device capable of performing a full function, the FFD can perform a communication with a different FFD or the RFD and may perform such a function as network initialization, node management, node information save, and the like. In particular, among the FFDs, a FFD enabling different devices to configure a network is called a PAN (personal area network) coordinator (hereinafter coordinator). Hence, the aforementioned network topology can be configured by the FFD performing the coordinator role.

Yet, the RFD performs less numbers of functions compared to the functions capable of being performed by the FFD. In particular, a counterpart device with which the RFD can communicate is limited to the FFD. Hence, the RFD cannot perform a coordinator role. Hence, the RFD may have a stack structure of a small size in a manner of shifting complete charge of a network function to the FFD and may save a calculation/memory resource. In particular, the RFD searches for a coordinator and transmits a data. And then, the RFD cuts off connection and enters into a save (sleep) mode. By doing so, amount of power consumption of the RFD may become very low and the RFD may operate long hours with battery power only.

Referring to FIG. 1, a device represented by 'F' indicates a FFD, a device represented by 'R' indicates an RFD, and a device represented by 'P' indicates a FFD performing a coordinator role.

In the star topology depicted in FIG. 1 (a), a communication between a device and a coordinator is performed only. In this case, devices correspond to a start point or an end point of the communication. On the contrary, a coordinator may become a start point, an end point, or a router.

The peer-to-peer topology depicted in FIG. 1 (b), each of the devices can communicate with all different devices in a network. Hence, such a network of a more complex form as a mesh network can be configured.

The star network topology can manage devices in a manner that battery life is maintained for long time and the peer-to-peer network topology has high data reliability and access recognition rate since at least one data delivery path can be configured by the topology.

Figure 2:
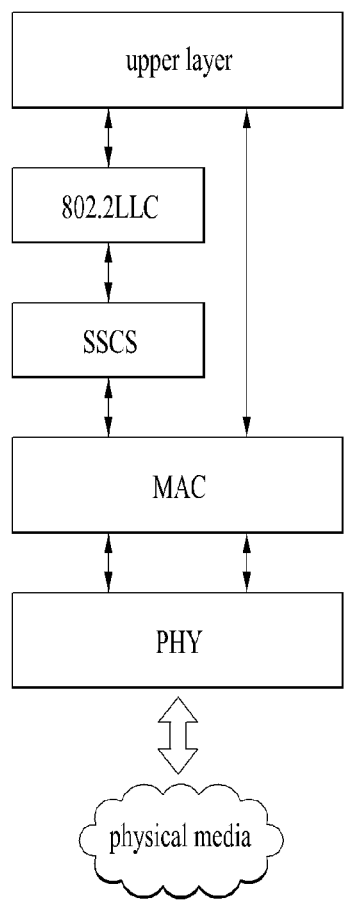
FIG. 2 is a diagram for a structure of a protocol stack of IEEE 802.15.4 standard corresponding to an example of an LR-WPAN system.

FIG. 2 is a diagram for a structure of a protocol stack of IEEE 802.15.4 standard corresponding to an example of an LR-WPAN system.

Referring to FIG. 2, the protocol stack includes a PHY layer (physical layer), a MAC layer (medium access control layer), and an upper layer.

The PHY layer includes an RF transceiver and a related control mechanism. The PHY layer can provide a PHY data service configured to transmit and receive PHY PDU (protocol data units) on a physical channel and a PHY management service configured to manage the PHY layer.

The MAC layer provides an access for a physical channel configured to transmit a data. The MAC layer can provide a MAC data service configured to transmit and receive MAC PDU (protocol data units) on a physical layer and a MAC management service configured to manage the MAC layer. The MAC layer can perform such a function as beacon management, channel access, GTS management, frame check, security function, and the like.

The upper layer consists of a network layer and an application layer. The network layer provides such a function as network configuration, processing, message routing, and the like. The application layer provides a function for which a device aims. As an example, IEEE 802.15.4 device 100 may function as an RFD (reduced function device), an FFD (full function device), or a coordinator depending on a type of an installed program, i.e., a type of a program configured to process data of the application layer.

Figure 3A:
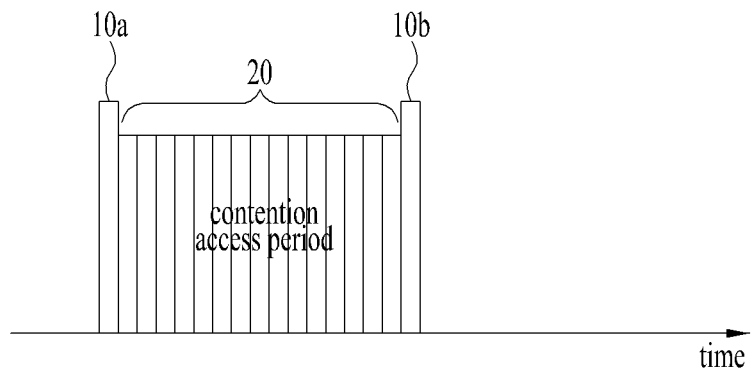
FIG. 3 is a diagram for a structure of a superframe of IEEE 802.15.4 system corresponding to an example of an LR-WPAN system.
Figure 3B:
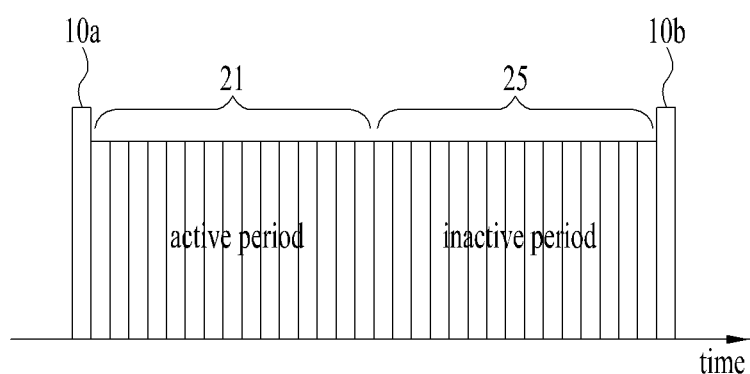
Figure 3C:
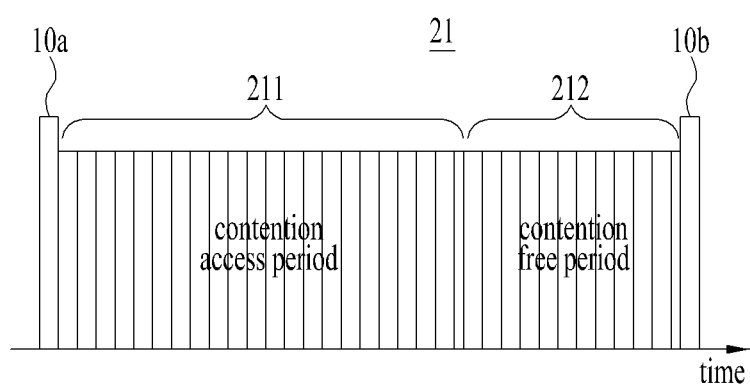

FIG. 3 is a diagram for a structure of a superframe of IEEE 802.15.4 system corresponding to an example of an LR-WPAN system.

A superframe structure used in the LR-WPAN system can be determined by a coordinator. The coordinator transmits a superframe where a beacon frame is configured to be positioned at a first slot. If the coordinator is not willing to use a superframe structure, the coordinator does not perform a beacon transmission.

Meanwhile, devices intending to transmit data wait for a beacon frame transmitted by the coordinator. Having received the beacon frame, the devices perform synchronization with a superframe structure. The beacon frame is used to synchronize devices participating in a PAN established by the coordinator, identify the PAN, and indicate the structure of the superframe.

In the following description, the structure of the superframe capable of being used for data transmission and reception between devices is explained with reference to FIG. 3.

The devices in the LR-WPAN system competitively perform a media access to transmit and receive data using the superframe. Yet, if a coordinator participating in the WPAN allocates a time slot to specific devices using the superframe, a device to which the time slot is allocated can transmit and receive data without competition with different devices. In particular, the devices participating in the WPAN can competitively or non-competitively perform the media access for transmitting and receiving data depending on a structure of a superframe determined by the coordinator.

FIG. 3 (a) shows a structure of a superframe indicating a contention access period. Referring to FIG. 3 (a), a superframe in the LR-WPAN system includes a plurality of time slots 20 (e.g. 16 time slots) configured to transmit and receive data between beacon frames (10a to 10b) transmitted by the coordinator. In case of using the aforementioned superframe, the devices participating in the WPAN can transmit a data frame to the coordinator using the time slot within the superframe based on a CSMA-CA (carrier sense multiple access/collision avoidance) scheme.

FIG. 3 (b) shows a structure of a superframe including an active period and an inactive period. Referring to FIG. 3 (b), the superframe in the LR-WPAN system can be configured to have an active period 21 and an inactive period 25 between beacon frames (10a to 10b).

The active period 21 is a period in which a data transmission and reception are performed between the devices. The active period 21 consists of time slots for the frames used to transmit and receive data. Yet, the inactive period 25 indicates a period in which data transmission and reception between the devices is not performed.

The coordinator can enter a low power mode during the inactive period 25.

A ratio of the inactive period 21 and the active period 25 may be called a duty cycle. A value of the duty cycle can be adjusted in consideration of a requisite for a low power operation of the LR-WPAN system and a requisite for coexistence of communication schemes using an identical transport channel.

FIG. 3 (c) shows a structure of an active period. Referring to FIG. 3 (c), the active period 21 used for data transmission and reception can be configured to have a contention access period (hereinafter abbreviated CAP) 211 and a contention free period (hereinafter abbreviated CFP) 212.

The CAP 211 consists of time slots used for the devices participating in the WPAN to competitively transmit a data frame. Hence, a device intending to perform a communication using the time slots belonging to the CAP 211 between the beacon frames (10a and 10b) may be put in competition with a different device in using a CSMA-CA scheme.

The CFP 212 consists of GTS (guaranteed time slots) corresponding to the time slots allocated for a specific device to transmit a data frame. The GTS may be used for a low-latency application program within the device or an application program requiring a specific transmission bandwidth.

For instance, the CFP 212 can be configured to position after the CAP 211 within the superframe and have maximum 7 GTSs in the IEEE 802.15.4 standard corresponding to an example of the LR-WPAN. And, the CFP 212 can be configured in a manner that pluralities of GTSs are allocated for a single device.

The coordinator determines a device to which each of the GTSs within the CFP 212 is allocated. GTS allocation information of the CFP 212, which is determined by the coordinator, can be transmitted in a manner of being included in a beacon frame 10a corresponding to a first slot of the superframe.

FIG. 4 is a rough flowchart for GTS management procedures capable of being selected by embodiments of the present specification in an LR-WPAN system.

First of all, a device 100, which intends to perform a non-competitive data transmission and reception for devices participating in a PAN, makes a request for a GTS allocation to a coordinator 200 of the PAN [S10].

Before making the request for the GTS allocation, the device 100 can determine a GTS length indicating the number of slots to be allocated as a GTS for the device 100 in a superframe, a GTS interval indicating an interval of the superframe to which the GTS is to be allocated, or if the interval to which the GTS to be allocated is designated, values of GTS window indicating a range available for the GTS allocation before and after the interval.

The device 100 can determine the GTS length, the GTS interval, or the GTS window based on a type of data to be transmitted or a transmission speed in the LR-WPAN.

The device 100 can determine the GTS interval in consideration of a speed necessary for a data transmission and reception. In particular, although a GTS is allocated to the device 100, the GTS interval can be used in case that it is not necessary to perform a data transmission and reception using a non-competitively allocated GTS in every superframe.

And, the device 100 can determine the GTS window in consideration of a processing capability or available frequency of data to be transceived. In particular, the GTS window can be used in case that the device 100 is expected to flexibly perform data transmission and reception before and after the GTS interval instead of exactly transmitting and receiving the data according to the GTS interval.

Subsequently, the coordinator 200 determines a GTS to be allocated to the device based on the GTS allocation request and transmits the determined GTS allocation information to the device 100 [S20].

The coordinator 200 determines the GTS allocation information for the device 100 based on field values necessary for the GTS allocation request. And, the coordinator 200 can determine the GTS allocation information including the number of slots to which the GTS is to be allocated, allocation interval of the GTS, or an available range of GTS allocation in consideration of a communication situation with the devices participating in the PAN.

Having received the determined GTS allocation information, the device 100 transmits/receives data with the coordinator 200 using a time slot indicated by the GTS allocation information [S30].

Subsequently, the coordinator 200 informs the device 100 of a cancellation of the GTS allocated to the device 100 by a request of the device 100 or a determination of the coordinator 200 [S40].

In the following description, a GTS management procedure according to the embodiment disclosed in the present specification is explained with reference to FIG. 5 to FIG. 7.

FIG. 5 is a flowchart for GTS management procedures capable of being selected by embodiments of the present specification based on IEEE 802.15.4 standard corresponding to an example of an LR-WPAN.

The device 100 makes a request for a GTS allocation to the coordinator 200 of the PAN [S10]. The GTS allocation request process [S10] is explained in detail. The device 100 transmits a GTS allocation request message to the coordinator 200 of the PAN [S11]. Having received the GTS allocation request message, the coordinator 200 transmits a reception confirmation message (ACK) to the device 100 in response to the GTS allocation request message [S12].

The GTS allocation request message is configured to include information making a request for a GTS allocation in order for the device 100 to perform a non-competitive data transmission and reception compared to different devices.

Figure 6:
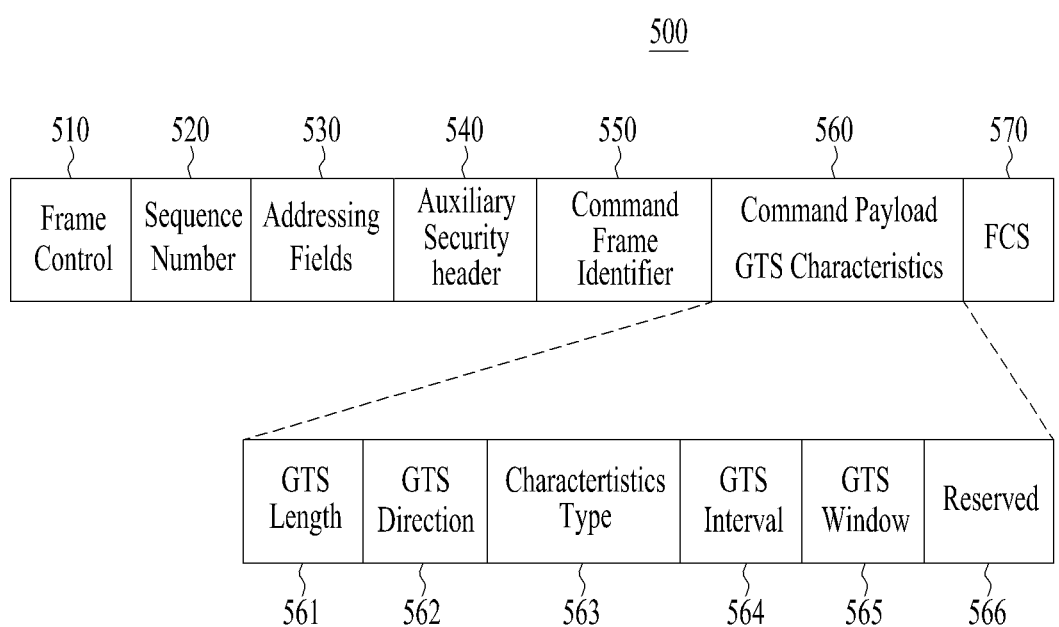
FIG. 6 is a diagram for a GTS request command frame used in IEEE 802.15.4 standard corresponding to an example of an LR-WPAN.

The GTS allocation request message may correspond to GTS request message depicted in FIG. 6. In particular, the device 100 can transmit the GTS allocation request to the coordinator 200 via a GTS request command frame 500. FIG.

6 is a diagram for the GTS request command frame used in IEEE 802.15.4 standard corresponding to an example of an LR-WPAN. The GTS request command frame can be used in order for the device 100 to make a request for a new GTS allocation or a cancellation of the allocated GTS to the coordinator 200.

The GTS request command frame 500 corresponds to a MAC frame and can be configured to include a MAC header (hereinafter abbreviated MHR), a MAC payload, and MAC footer (hereinafter abbreviated MFR). In the following description, a structure of a GTS request message, which is configured by the device 100 to make a request for a new GTS allocation, is explained with reference to FIG. 6.

Referring to FIG. 6, the MHR can be configured to include a frame control field 510, a sequence number field 520, addressing fields 530, and an auxiliary security header field 540.

Among the fields consisting of the MHR, the frame control field 510 includes a value indicating that the command frame 500 corresponds to a MAC command frame, the sequence number field 520 includes a current value of macDSN, and the addressing fields 530 may include a reception and/or transmission address. And, the auxiliary security header field 540 may include information necessary for a security processing of the MAC command frame 500.

Referring to FIG. 6, the MAC payload can be configured to include a command frame identifier 550 and a command payload 560.

Among the fields consisting of the MAC payload, the command frame identifier 550 indicates a type of command of the command frame 500. For instance, a GTS request command for the GTS allocation request may have a value of '0x09'.

And, among the fields consisting of the MAC payload, the command payload 560 for the GTS request command may correspond to a value indicating a GTS characteristic value. The GTS characteristic value 560 includes values indicating a characteristic of a GTS requested to the coordinator 200 by the device 100.

To this end, the GTS characteristic value 560 can be configured to include a GTS length field 561, a GTS direction field 562, a characteristic type field 563, a GTS interval field 564, and a GTS window field 565.

The GTS length field 561 indicates the number of slots to be allocated as a GTS. The device 100 can determine the GTS length field 561 in consideration of transmission speed of data to be transceived using the GTS.

The GST direction field 562 indicates whether the allocated GTS is for a data transmission or a data reception of the device 100.

The characteristic type field 563 indicates whether the GTS request command is for a GTS allocation or a GTS de-allocation.

The GTS interval field 564 indicates an allocation interval configured to designate how often a GTS is allocated in terms of a superframe. For instance, the GTS interval field 564 may have a value indicating an interval of a superframe to which the GTS is allocated or a value of a specific time to which the GTS is allocated. The device 100 determines a value of the GTS interval field 564 in consideration of a size of a superframe of the PAN in which the device participates.

The GTS window field 565 indicates a value indicating a range capable of being allocated by a GTS in before and after a superframe designated by the GTS interval field 564. The device 100 compares a transmission speed of data to be transceived with the GTS interval using a GTS to be allocated. If it is anticipated that the transmission speed is variable, the device can determine the GTS window field 565 in consideration of the variable range.

And, referring to FIG. 6, the MFR can be configured to include a frame check sequence (hereinafter abbreviated FCS) 570. The FCS can be used to judge whether there is an error of data transmission for the MHR and the MAC payload.

As mentioned in the foregoing description with reference to FIG. 6, the device 100 can make a request for a GTS allocation in a manner of transmitting the GTS request command frame 500 to the coordinator 200.

Referring back to FIG. 5, having received the GTS allocation request, the coordinator 200 can transmit a reception confirmation message (ACK) to the device 100 in response to the GTS allocation request [S12].

Subsequently, the coordinator 200 determines a GTS to be allocated to the device 100 based on the GTS allocation request. The coordinator 200 determines GTS allocation information necessary for the device 100 based on the field values required for the GTS allocation request. And, the coordinator 200 can determine the GTS allocation information including the number of slots to which the GTS is to be allocated, the allocation interval of the GTS, or an available range capable of being allocated by the GTS in consideration of a communication situation with devices participating in the PAN.

Specifically, the coordinator 200 can inspect available capacity in a current superframe. The inspection on the available capacity can be performed in a manner of comparing a remaining length in a CAP with a length of the GTS requested by the device 100.

And, in performing the inspection on the available capacity, the coordinator 200 may consider the maximum number of time slots capable of being allocated as the GTS or a minimum length of the CAP, which is decreased due to the GTS allocation.

Subsequently, the coordinator transmits the determined GTS allocation information to the device 100 [S21]. The determined GTS allocation information can be transmitted in a manner of being included in a beacon frame. In particular, the coordinator 200 can transmit the determined GTS allocation information to the device 100 via the beacon frame. FIG. 7 is a diagram for a beacon frame used in IEEE 802.15.4 standard corresponding to an example of an LR-WPAN. Similar to the device 100, the beacon frame 600 can be used to synchronize the devices participating in the PAN established by the coordinator, identify the PAN, and indicate a structure of a superframe.

The beacon frame 600 also corresponds to a MAC frame and can be configured to include a MHR 610, a MAC payload, and a MFR 680.

Figure 7:
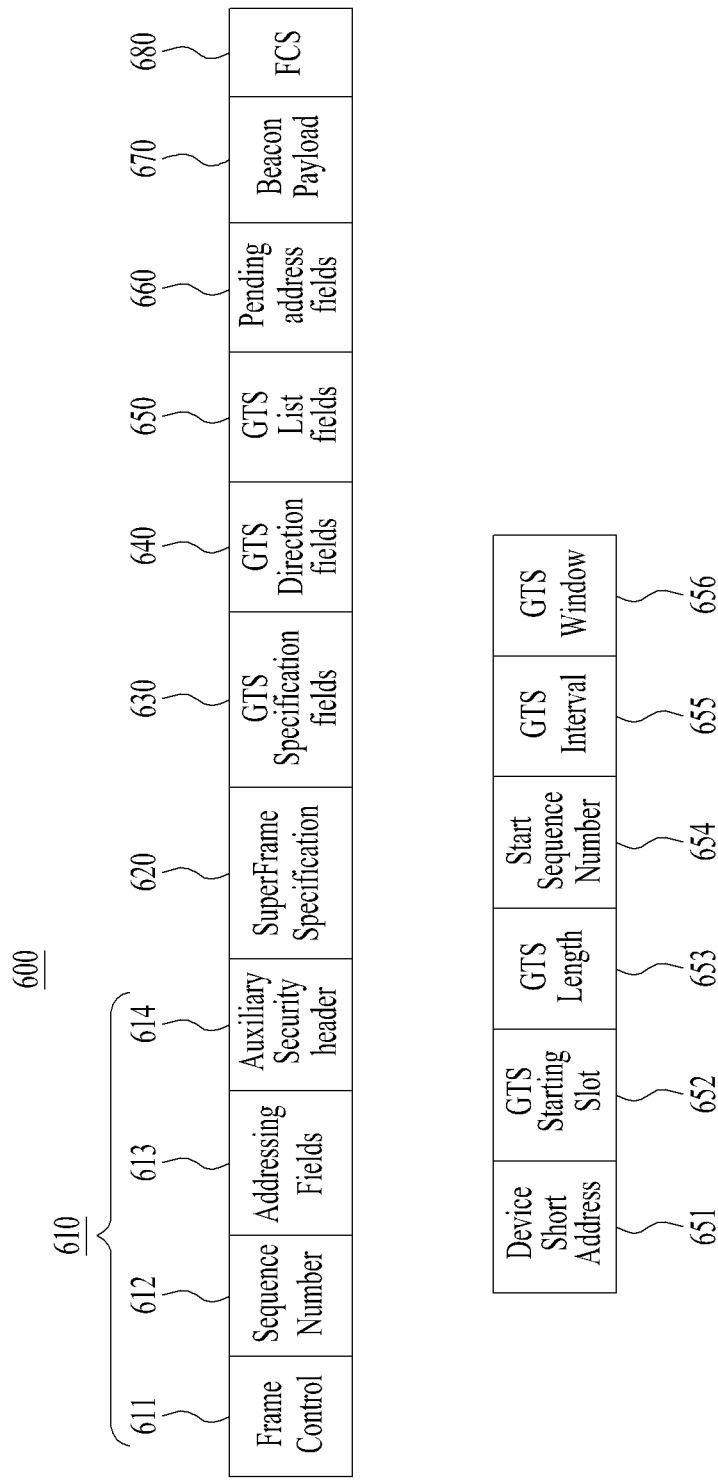
FIG. 7 is a diagram for a beacon frame used in IEEE 802.15.4 standard corresponding to an example of an LR-WPAN.

Referring to FIG. 7, the MHR 610 of the beacon frame 600 can include a frame control field 611, a sequence number field 612, addressing fields 613, and an auxiliary security header field 614.

The frame control field 611 can include a frame type sub field indicating that a type of the MAC frame corresponds to a beacon frame, a source addressing mode sub field identifying a coordinator 200 configured to transmit the beacon frame 600, and the like. The sequence number field 612 can include a current value of macBSN. The addressing fields can include information on a source device and a source PAN.

And, referring to FIG. 7, the MAC payload of the beacon frame 600 can be configured to include a superframe specification field 620, a GTS specification field 630, a GTS direction field 640, a GTS list field 650, a pending address field 660, and a beacon payload field 660.

The superframe specification field 620 can include a beacon order, a superframe order, a last CAP slot, battery life information, information on whether it is transmitted from a PAN coordinator, and the like.

The GTS specification field 630, the GTS direction field 640, and the GTS list field 650 can be called GTS fields.

The GTS specification field 630 can include a GTS descriptor count subfield. The GTS descriptor count subfield indicates the number of GTS descriptors to be included in the GTS list field 650. For instance, if a size of the GTS descriptor count subfield corresponds to 3 bits, the GTS list field 650 can include maximum 7 GTS descriptors.

The GTS direction field 640 can include a GTS direction mask subfield indicating directions of GTSs within the subframe. In particular, the GTS direction mask subfield can indicate whether each of the GTSs included in the GTS list is used for a data transmission (transmit-only) or a data reception (receive-only).

The GTS list field 650 can include a GTS descriptor field indicating GTS allocation information. The GTS list field 650 can include one or more GTS descriptor fields according to a value indicated by the GTS descriptor count subfield. And, the GTS direction mask subfield can determine whether each of the GTS descriptor fields is used for a data transmission or a data reception.

As depicted in FIG. 7, each of the GTS descriptor fields included in the GTS list field 650 can be configured to include a device short address field 651, a GTS starting slot field 652, a GTS length field 653, a start sequence number field 654, a GTS interval field 655, and a GTS window field 656.

The device short address field 651 indicates an address of a device to which a GTS is allocated by the GTS descriptor. In particular, if the GTS related to the GTS descriptor field is allocated to the device 100, the device short address field 651 has an address of the device 100.

The GTS starting slot field 652 indicates information on a superframe slot where a GTS starts.

The GTS length field 653 indicates the number of GTSs contiguously activated in a superframe.

The GTS interval field 655 indicates a value designating how often a GTS is allocated in term of a superframe. The GTS interval field 655 may have a value indicating an interval of a superframe to which a GTS is allocated or a specific time value to which a GTS is allocated.

The GTS window field 656 indicates a value indicating a range capable of being allocated by a GTS in before and after a superframe designated by the GTS interval field 555.

As mentioned in the foregoing description with reference to FIG. 7, the coordinator 200 can inform the device of information on the GTS allocated for the device 100 by transmitting the beacon frame 600 to the device 100.

Referring back to FIG. 5, having received the beacon frame 600, the device 100 transmit and receive data with the coordinator 200 using a time slot indicated by the GTS allocation information [S30].

Data transmission and reception between the device 100 and the coordinator 200 can be performed using a data frame. As depicted in FIG. 5, data transmission and reception process can be performed between the device 100 and the coordinator 200 in a manner that a plurality of data frames are transmitted/received [S31 to S34] until the allocated GTS is de-allocated. The data frame used for the data transmission and reception can be periodically transmitted/received according to an indication of the GTS interval.

Meanwhile, a method of transmitting/receiving data between the device 100 and the coordinator 200 using the allocated GTS is specifically determined according to the GTS allocation information.

If the GTS interval within the GTS allocation information, which is used for the device 100, corresponds to '1' and the GTS window corresponds to '0', GTS of every superframe can be used to transmit/receive data. The data transmission and reception using a GTS in case that the GTS interval indicates '1' and the GTS window indicates '0' corresponds to a method that a specific device occupies all GTSs until the GTS is de-allocated. Hence, the aforementioned method of transmitting/receiving data shows a result identical to that of data transmission and reception using a legacy GTS not defined by the GTS interval field and the GTS window field.

If the GTS interval indicates a value greater than every superframe, GTS allocation can be performed for different devices in superframe except the superframe to which a GTS is allocated for the device 100.

And, the device 100 can use the superframe to which the GTS is allocated to transmit and receive data according to a prescribed period due to the GTS interval within the GTS allocation information. If both the GTS interval and the GTS window are used together, the device 100 can transmit and receive data using superframes as many as the number of superframes indicated by before and after GTS windows on the basis of a periodical superframe indicated by the GTS interval.

Subsequently, the coordinator 200 informs the device 100 of a cancellation of the GTS allocated to the device by a request of the device 100 or a determination of the coordinator 200 [S40].

The cancellation of the GTS allocation requested by the device 100 can be performed using the aforementioned GTS request command frame. In particular, the device 100 transmits the GTS request command frame, which indicates that the characteristic type field is used for the cancellation of the GTS allocation, to the coordinator 200 to make a request for the cancellation of the GTS allocation to the coordinator 200 [S40]. Having received the GTS allocation cancellation request, the coordinator 200 can transmit a reception confirmation frame to the device 100 [S42].

And, the cancellation of the GTS allocation determined by the coordinator 200 can be performed by transmitting a beacon frame including a GTS descriptor, which indicates the cancellation of the GTS allocation, by the coordinator 200. The cancellation of the GTS allocation determined by the coordinator 200 may occur due to an expiration of the GTS.

Figure 8:
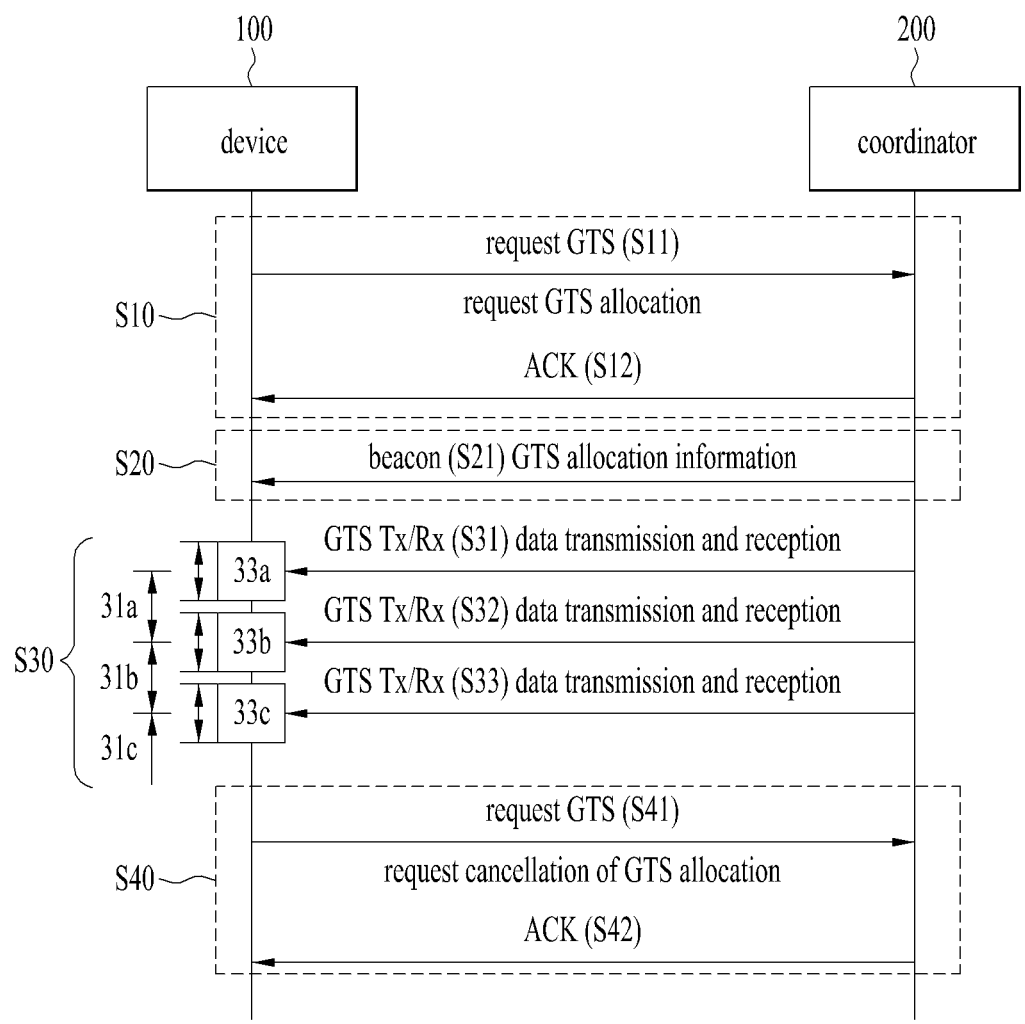
FIG. 8 is a flowchart for an example of transmitting/receiving data in accordance with a GTS interval and a GTS window in an LR-WPAN system according to an embodiment disclosed in the present specification.

FIG. 8 is a flowchart for an example of transmitting/receiving data in accordance with a GTS interval and a GTS window in an LR-WPAN system according to an embodiment disclosed in the present specification.

Since a GTS allocation request process [S10] and a GTS allocation information transmission process [S20] depicted in FIG. 8 are identical to each of the processes [S10 and S20] explained with reference to FIG. 5, detail explanation on the processes is omitted.

If a GTS is allocated for the device 100, the device 100 transceives a data frame with the coordinator 200 [S30].

Among GTS allocation information used for the device 100, if a GTS interval field is designated, the data frame can be periodically transmit/received in a manner of being included in a superframe according to an interval indicated by the GTS interval field. And, among the GTS allocation information, if a GTS window field is designated, a range of a superframe, which is capable of being allocated by a GTS, is extended to before and after the superframe designated by the GTS interval field.

Referring to FIG. 8, in order to perform the data transmission and reception between the device 100 and the coordinator 200, the GTS interval field periodically designates a superframe including a GTS according to a prescribed interval (31*a*, 31*b*, 31*c*, and the like). The GTS window field designates a range (33*a*, 33*b*, 33*c*, and the like) of a superframe capable of including a GTS before and after the superframe designated by the GTS interval field. Hence, the device 100 can transceive data with the coordinator 200 using the superframe positioned within the range (33*a*, 33*b*, 33*c*, and the like) designated by the GTS interval field and the GTS window field [S31, S32, S33 etc.].

Subsequently, since a process [S40] of cancelling the GTS allocated to the device 100 by the coordinator 200 is identical to the process [S40] explained with reference to FIG. 5, it is omitted.

Figure 9:
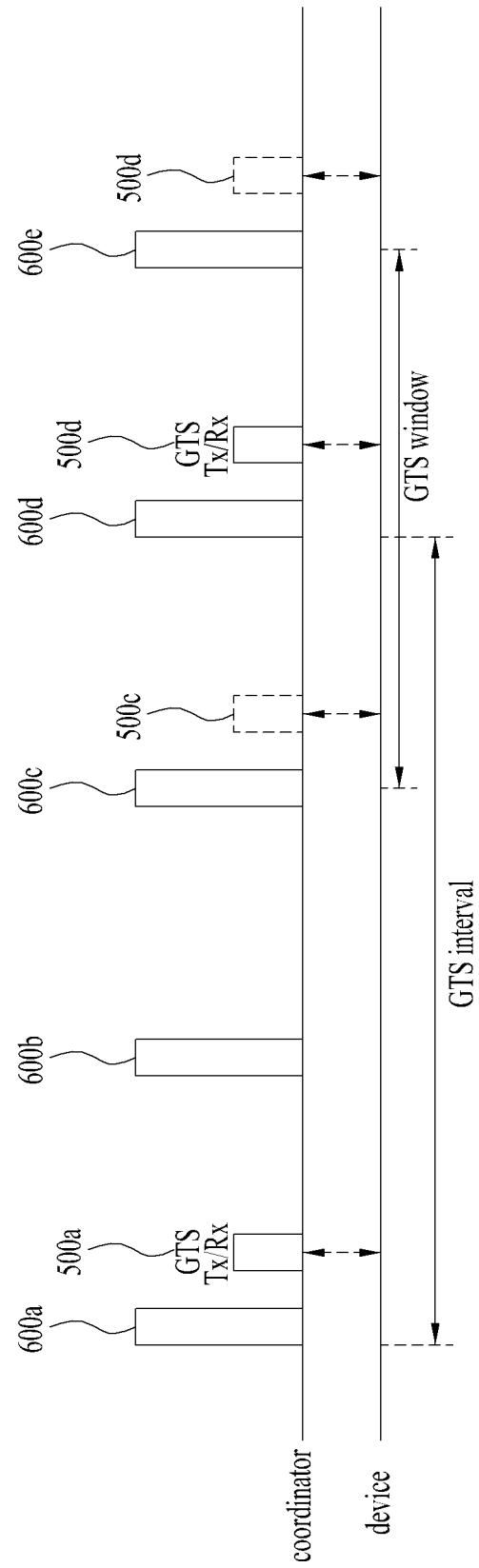
FIG. 9 is a diagram for a process of transmitting/receiving data in accordance with a GTS interval and a GTS window in an LR-WPAN system according to an embodiment disclosed in the present specification.

FIG. 9 is a diagram for a process of transmitting/receiving data in accordance with a GTS interval and a GTS window in an LR-WPAN system according to an embodiment disclosed in the present specification.

FIG. 9 shows an example that the GTS interval corresponds to '3' and the GTS window corresponds to '2' in the data transmission and reception process explained with reference to FIG. 8.

Referring to FIG. 9, beacon frames (600*a*, 600*b*, 600*c*, 600*d*, and 600*e*), which become boundary of a superframe, are periodically transmitted to the device 100 from the coordinator 200. If the superframe separated by the beacon frame 600*a* includes a GTS used for the device 100, the device 100 and the coordinator 200 can transmit and receive a data frame 500*a* necessary for performing a non-competitive data transmission and reception using the allocated GTS.

Subsequently, the device 100 and the coordinator 200 can perform a data transmission and reception using the GTS after the subframes as much as the GTS interval. In particular, the coordinator 200 transmits beacon frames (600*b*, 600*c* and 600*d*), which become boundaries of 3 subframes corresponding to the GTS interval. The device 100 can transceive a data frame 500*b* with the coordinator 200 using the GTS included in the superframe, which is separated by the beacon frame 600*d*.

And, a data frame can be transceived before and after the data frame 500*b* according to the GTS window in a range indicated by the GTS window. In particular, the device 100 can transceive data with the coordinator 200 using a data frame 500*c* within a superframe, which is separated by the beacon frame 600*c*, or a data frame 500*d* within a superframe, which is separated by the beacon frame 600*d*.

Figure 10:
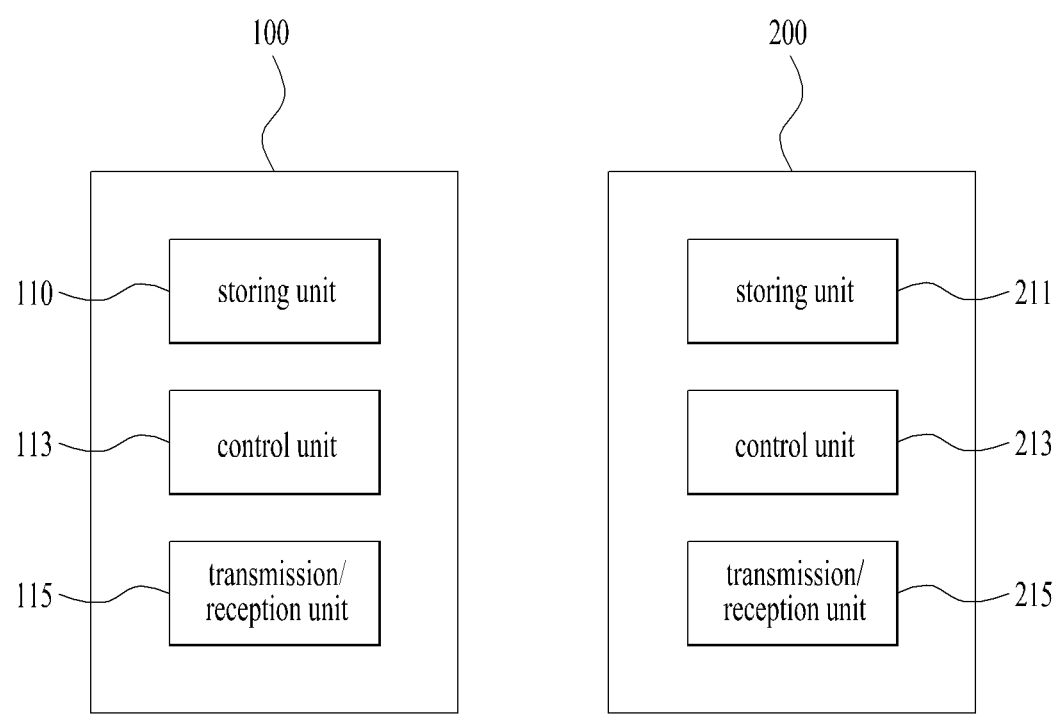
FIG. 10 is a block diagram for a device and a coordinator of an LR-WPAN system according to embodiments of the present invention.

FIG. 10 is a block diagram for a device and a coordinator of an LR-WPAN system according to embodiments of the present invention.

As depicted in FIG. 10, the device 100 participating in a WPAN is configured to include a storing unit 111, a control unit 113, and a transmission/reception unit 115. The coordinator 200, which configures the WPAN, is configured to include a storing unit 211, a control unit 213, and a transmission/reception unit 215.

The storing unit 111/211 stores the methods depicted in FIG. 4 to FIG. 9, respectively and the control unit 113 controls the storing unit 111 and the transmission/reception unit 115 in a manner of executing the methods stored in the storing unit 111. The control unit 213 controls the storing unit 211 and the transmission/reception unit 215 in a manner of executing the methods stored in the storing unit 211.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

What is claimed is:

1. A method of transmitting a data, which is transmitted by a first device in a WPAN (wireless personal area network) system, the method comprising:
    transmitting a message, which makes a request for a transmission band used for a non-competitive data transmission and reception of the first device, to a second device;
    receiving a transmission band allocation information from the second device in response to the message, which makes a request for the transmission band; and
    transceiving a data with the second device in accordance with the transmission band allocation information,
    wherein the transmission band allocation information comprises a length, an interval, and a window information of a transmission band used for a non-competitive transmission and reception.

2. The method of claim 1, the step of transceiving the data with the second device, comprising the step of transceiving a data using a superframe of the interval period among periodically formed superframes.

3. The method of claim 2, the step of transceiving the data with the second device, further comprising the step of transceiving a data using a superframe belonging to a band window based on the window information.

4. The method of claim 3, wherein the band window comprises superframes preceding or following a superframe corresponding to the interval period.

5. The method of claim 4, wherein the transmission band used for the non-competitive data transmission and reception indicates a GTS (guaranteed time slot).

6. The method of claim 5, wherein the transmission band allocation information is received in a manner of being contained in a beacon frame.

7. The method of claim 6, wherein the transmission band allocation information is received via a GTS descriptor within the beacon frame.

8. The method of claim 1, further comprising the step of determining a characteristic of the requested transmission band based on a characteristic of data used for the non-competitive data transmission and reception,
    wherein the characteristic of the transmission band comprises a length of the transmission band, an allocation interval, or a size of a window.

9. A method of allocating a transmission band in a WPAN (wireless personal area network) system in which a first device and a second device participate, the method comprising:
    receiving a message, which makes a request for a transmission band used for a non-competitive data transmission and reception, from the first device;
    allocating a non-competitive transmission band for the first device; and
    transmitting a transmission band allocation information for the first device,
    wherein the transmission band allocation information comprises a length, an interval, and a window information of a transmission band used for a non-competitive transmission and reception.

10. The method of claim 9, wherein the transmission band used for the non-competitive data transmission and reception indicates a GTS (guaranteed time slot).

11. The method of claim 10, wherein the transmission band allocation information is transmitted via a beacon frame.

12. The method of claim 11, wherein the transmission band allocation information is transmitted in a manner of being contained in a GTS descriptor within the beacon frame.

13. The method of claim 9, further comprising the step of checking the non-competitive transmission band capable of being allocated for the first device, wherein the transmission band allocation information is determined based on a result of the checking step.

14. The method of claim 13, wherein the message, which makes a request for the transmission band, comprises a length of a requested band and wherein a process of checking the non-competitive transmission band capable of being allocated is performed based on the length of the requested band.

15. A user equipment of a WPAN (wireless personal area network) system, the user equipment comprising:
    a transmission and reception unit configured to perform a communication with a coordinator; and
    a control unit configured to control the transmission and reception unit,
    the control unit configured to transmit a message, which makes a request for a transmission band used for a non-competitive data transmission and reception, to the coordinator, the control unit configured to receive transmission band allocation information from the coordinator in response to the message, which makes a request for the transmission band, the control unit configured to transceive a data with the coordinator, wherein the transmission band allocation information comprises a length, an interval, and a window information of a transmission band used for a non-competitive transmission and reception.

* * * * *